Figure 1:
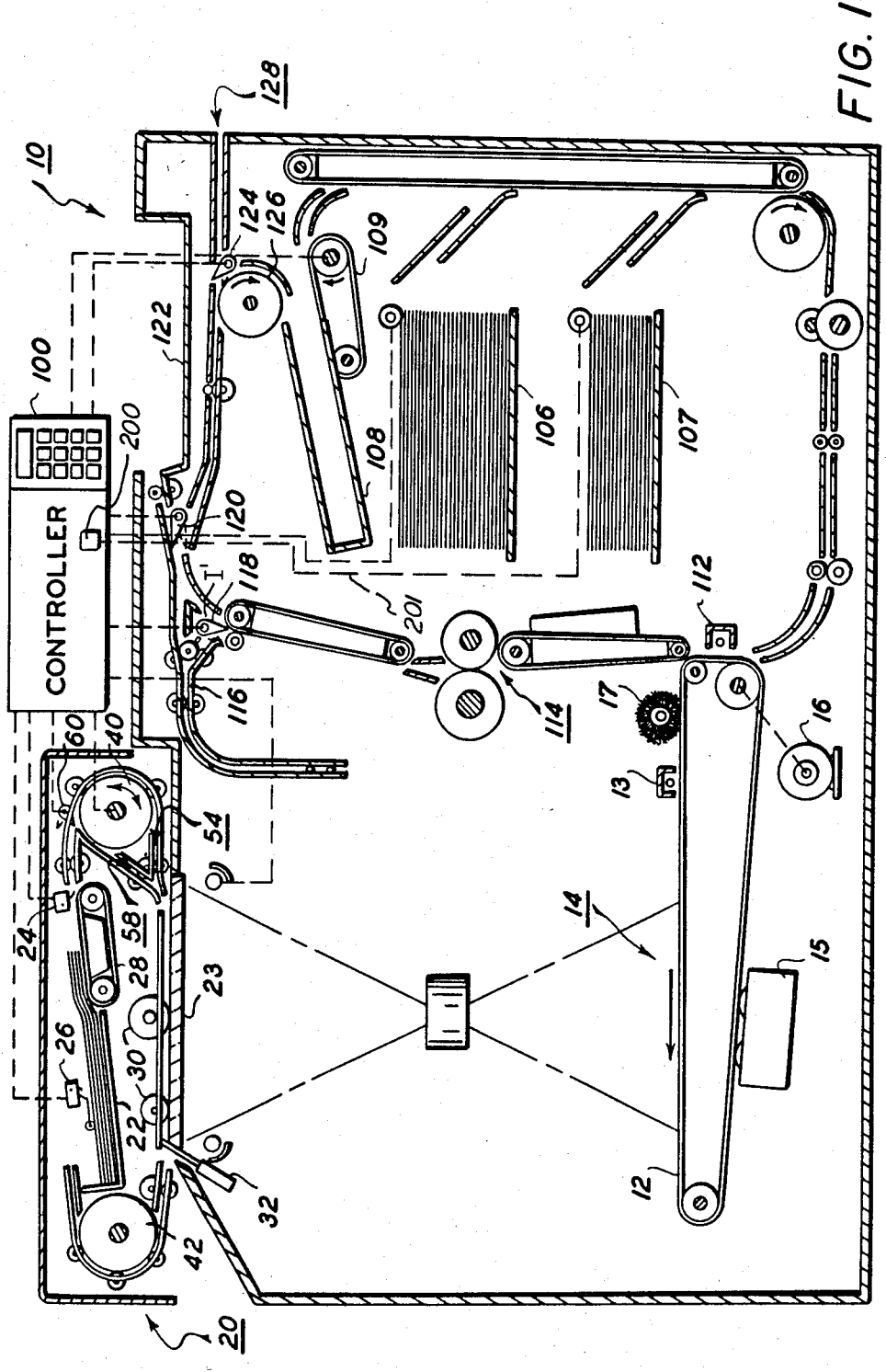

United States Patent [19]

Ziehm

[11] Patent Number: 4,536,078
[45] Date of Patent: Aug. 20, 1985

[54] RECIRCULATIVE DOCUMENT DUPLEX COPYING

[75] Inventor: Richard T. Ziehm, Webster, N.Y.

[73] Assignee: Xerox Corporation, Stamford, Conn.

[21] Appl. No.: 497,945

[22] Filed: May 25, 1983

[51] Int. Cl.$^3$ .......................... B65H 5/26; B65H 5/02; B65H 1/06; G03G 15/00

[52] U.S. Cl. .......................... 355/14 SH; 355/3 SH; 355/3 R; 355/14 R; 271/3; 271/4; 271/5

[58] Field of Search .................. 355/3 R, 14 R, 3 SH, 355/8, 14 SH, 23, 24, 26, 50, 51, 77; 271/3, 3.1, 4, 5, 6, 7, 8, 9, 65, DIG. 9

[56] References Cited

U.S. PATENT DOCUMENTS

| | | | |
|---|---|---|---|
| 4,218,128 | 8/1980 | Satomi et al. | 271/9 X |
| 4,229,101 | 10/1980 | Hamlin et al. | 355/77 |
| 4,231,561 | 11/1980 | Kaneko et al. | 271/9 X |
| 4,264,067 | 4/1981 | Adams et al. | 271/9 X |
| 4,278,344 | 7/1981 | Sahay | 355/14 SH |
| 4,330,197 | 5/1982 | Smith et al. | 355/14 SH |
| 4,362,379 | 12/1982 | Tiek et al. | 355/3 SH |
| 4,466,733 | 8/1984 | Pels | 355/14 R |
| 4,468,114 | 8/1984 | Pels et al. | 355/14 R |

OTHER PUBLICATIONS

Research Disclosure, "Document Preparation Means", John L. Connin, Aug. 1976, No. 14858, pp. 44, 45.
Research Disclosure, "Duplex Copying System", Disclosed anonymously, Feb. 1980, No. 19015, p. 61.

*Primary Examiner*—A. T. Grimley
*Assistant Examiner*—Terry Flower

[57] ABSTRACT

An automatic document handling system 20 for recirculative precollation copying in reverse serial order of a set of simplex document sheets on a simplex and duplex copier 10 to provide precollated simplex or duplex (two-sided) copies with proper orientation of the document images on the outputted copy sheets 128 for copies made on preprinted, prepunched, or other special orientation restricted copy sheets, as well as for copies made on plain paper or other non-orientation sensitive copy sheets. The copier 10 has a special copy sheet supply 107 for said special orientation restricted copy sheets and a main copy sheet supply 106 restricted to conventional nonorientation sensitive copy sheets. Switching systems, e.g. 200, provide for selecting between the feeding of copy sheets from the main supply 106 or the special copy sheet supply 107 and for selecting between simplex or duplex copying, and connect with overall control system 100. The control system 100 causes the document handling system 20 to circulate the set of document sheets once before copying them, to count them and determine whether there are an odd or even number, only in response to both the first switching system 200 selection of the special copy sheet supply 107 rather than the main copy sheet supply 106 and the selection of duplex copying rather than simplex copying. The former selection is automatically removed after each copying run. If copies are made from the main tray 106 copying begins on the first circulation of the documents. Thus this system improves the efficiency of systems such as that of U.S. Pat. Nos. 4,330,197 and 4,278,344.

7 Claims, 3 Drawing Figures

RECIRCULATIVE DOCUMENT DUPLEX COPYING

Cross-reference is made to a related application filed concurrently herewith by Charles E. Smith; U.S. Ser. No. 497,944.

The present invention relates to an improved system for providing more efficient recirculatory precollation duplex copying of sets of original document sheets onto normal copy sheets.

The present invention is an improvement in the precollation simplex/duplex copying system of U.S. Pat. No. 4,330,197 issued May 18, 1982 to Richard E. Smith et al. Most of the exemplary copier and document recirculating embodiment apparatus details disclosed in this specification are disclosed in U.S. Pat. No. 4,278,344 issued July 14, 1981 to Ravi B. Sahay, and in U.S. Applications Ser. Nos. 448,654 and 448,655, now U.S. Pat. Nos. 4,466,733 and 4,468,114 respectively, filed Dec. 10, 1982 by Susan J. Pels, solely and with Donald W. Schaeffer, respectively, all with this same assignee. An advantage of the present system is that it may be used with such disclosed apparatus without substantial structural modification. However, the present system is not limited to that apparatus and is usable with various other recirculative document handlers and copiers.

As xerographic and other copiers increase in speed, and become more automatic, it is increasingly important to provide higher speed yet more reliable and more automatic handling of both the copy sheets and the original documents being copied, i.e. both the output and input of the copier. However, the providing of recirculative document copying for precollation copying, especially for duplex (two-sided) copies, greatly complicates and increases the document sheet and copy sheet handling complexities.

The following terminology is generally used in the description herein: The term "sheet" generally refers to conventional sized flimsy sheets of paper, plastic, or other conventional or typical individual image substrates (original or copy), and not to microfilm or electronic images which are generally much easier to manipulate. However, the terms document, document page, or document image, unless specified as relating to sheets, may also be read as encompassing laser printed or otherwise electronically generated, stored, and/or rearranged images. The term "page" here generally refers to one side or "face" of a sheet or a corresponding image thereof. A "simplex" document or copy sheet is one having its page and image on only one side or face of the sheet, whereas a "duplex" document or copy sheet has pages on both sides. The term "duplex copying" may be more specifically defined into several different known copying modes. In "duplex/duplex" copying, both sides (both pages) of a duplex document sheet are copied onto both sides of a copy sheet. In "simplex/duplex" copying, the two page images of two successive simplex document sheets are copied onto the opposite sides of a single (duplex) copy sheet. In "duplex/simplex" copying, both sides of a duplex document are copied onto one side of two successive (simplex) copy sheets. In non-duplex copying, i.e. "simplex/simplex" copying, one side of each simplex document is copied onto one side of each copy sheet. In other printing arts, as contrasted to copier art, two-sided copying may be referred to as "backing-up" rather than duplex copying. A commercially desirable precollation document handling and copying system should compatibly provide all of these copying modes, although "duplex/simplex" need not be provided. The present system particularly relates to a "simplex/duplex" precollation copying system which is fully compatible, with the same apparatus, with all of the other said copying modes.

"RDH" is an abbreviation for an automatic recirculating document handler, in which document sheets are automatically fed from a stack, copied and returned thereto, normally for a precollation copying system. The present system is particularly suited for a precollation (multiply recirculated) document copying system, but is also compatible with non-precollation copying with the same apparatus.

Precollation, or collation copying, as it is variably called, is a known desirable feature for a copier, which provides a number of important advantages. In precollation copying any desired number of precollated copy sets may be made by making a corresponding number of recirculations of the original document set in collated order past the copier imaging station and normally copying each document page only once or twice each time it circulates past the imaging station. The copies automatically exit the copier in precollated sets, and thus do not require subsequent sorting in a sorter or collator. Proofing and on-line finishing and/or removal of any completed copy sets may thus be provided while further copy sets are being made from the subsequent circulations of the same document set.

However, a disadvantage of precollation copying systems is that the set of documents must be recirculated and copied in a predetermined seriatim page order by a number of set circulations equivalent to the desired number of copy sets. Thus, increased document handling is required for a precollation copying system as compared to a post-collation copying system. Also, for duplex copying the copy sheets must normally also be recirculated once in the copying path in coordination with the document set recirculation in order to print images on both sides thereof. Therefore, maximizing document handling automation and copying cycle efficiency is particularly important in precollation copying. If the document handler cannot efficiently and rapidly circulate and copy documents in coordination with copy sheets in the correct order, or must excessively skip documents or copying cycles, the total copying time for completing all of the copy sets will be increased. Also, for collation copying, minimizing the time delay from the initiation of copying until the first copy set is completed and outputted is another important factor. This may be referred to as "first copy set out time".

In contrast, in a post-collation copying system, several identical copies are made at one time from each document page. Collation must be done after copying by each identical copy being placed in a different sorter bin. The document set need only normally be circulated or manually or semiautomatically fed to the imaging station once. Thus, at the end of the document set circulation each utilized bin of the copy sheet sorter or collator contains one collated copy set. However, the number of copy sets which can be made in one document circulation is limited by the number of available sorter bins. Also, a sorter adds space and complexity and is not well suited for on-line finishing. Further, the "first copy set out time" for any completed sets is delayed for the copying and collating of all the other sets of that copying run. However, post-collation copying, or manual document placement, are desirable in certain copying situations to minimize document handling. Also post-collation can employ slower document handling in that the copying rate is not limited by any document exchange times during the times the plural copies are being made. Thus, it is desirable in some cases that a precollation copying system be compatible with, and alternatively usable for, post-collation or manual document handling as well.

Both forward serial order (1 to N) and reverse order (N to 1) precollation copying of original documents, for both simplex (one-sided) and duplex (two-sided) original documents and copies, is shown in the cited art. Examples of 1 to N, normal, or forward serial order, document recirculation systems for precollation simplex or duplex copying systems are disclosed in U.S. Pat. No. 4,229,101 to T. J. Hamlin et al., U.S. Pat. No. 4,234,180 to J. H. Looney, and U.S. Pat. No. 4,355,880 to D. J. Stemmle, and art cited therein.

However, as further explained below, N to 1 (reverse order) document set circulation is commercially more conventional for systems feeding documents from a tray positioned over a platen of a copier. In such conventional systems the set of documents is loaded (stacked) face-up, and each document sheet is fed out from the bottom of the stack, copied, and restacked back on the top of the stack. Thus the simplex documents are circulated in an endless loop by being turned over, copied, turned over again, and returned back to the top of the stack over the platen.

A major disadvantage of such N to 1 or backwards document feeding and copying order is that the copier controller does not know what document pages are being fed on the first circulation, since the last (Nth) page is fed first. Not knowing whether a document page being fed and copied is odd or even, and duplexing accordingly, has distinct disadvantages for making duplex (two sided) copies. If the number of original document pages is odd, the last (Nth) duplex copy sheet should be blank on one side, and also desirably will have special handling. Also the inversions of copy sheets will vary depending on whether there are an odd or even number of originals, affecting the copy sheet output orientation it is controlled in response to that information. This problem has lead to simplex/duplex copying with either precounting of the entire document set before copying (with an initial non-copying circulation) and/or selective use of a copy sheet inverter in the copy sheet path, with various disadvantages, as explained more fully below and in the above-cited patents.

Thus commercial RDH copying systems which feed documents in backwards or reverse page order, i.e. from the last or Nth page to the first page, provide, when simplex/duplex copying is selected, a non-copying initial counting circulation of all the simplex documents, to automatically determine whether the Nth (first copied) document is odd or even. This pre-count or slew cycle as it is called was first disclosed in the above-cited U.S. Pat. No. 4,330,197 by R. E. Smith and J. R. Yonovich.

This pre-count cycle, especially for a large document set, decreases the perceived productivity of the copier by cycling the document handler without imaging the originals at the beginning of copying when it is most noticeable. I.e., when there is no copy sheet output, finishing, or handling to occupy the operator's time. The larger the document set (the more document sheets) the greater this delay in first copy set out time for simplex/duplex copying using a pre-count circulation. A pre-count cycle, and also any increased use of a copy sheet inverter, also adversely affects system reliability by requiring extra handling of the document set and the copy sheets.

An important reason for using a precount cycle is that not knowing whether a document being fed is an odd or even page particularly complicates the simplex/duplex operation of a copier when it is desired to use letterhead, binder edged, pre-punched, marginal, or other special copy sheets which require a particular face or orientation of the copy sheet to be printed or bound. For example, with letterhead paper, for duplex copying page 1 must be printed on the letterhead side, not the obverse side. Using paper with ring or spiral binder holes, the odd document pages should be copied so that the holes are on the left hand side of the page and the even document pages should be copied so that the holes are on the right. Also, if the copier finisher has an on-line corner stapler, the copy sheets must be automatically placed in the finisher in the correct orientation for stapling the correct corners.

Note that these special paper problems cannot be overcome merely by providing different copy sheet output paths, as, for example in U.S. Pat. No. 4,362,379 issued Dec. 7, 1982 to F. J. A. M. Tiek et al. (Oce-Netherland). However the latter patent is of particular interest for its discussion in Col. 1 of the "last-page problem" [even for conventional copy sheets] and for its avoidance of initially counting the number of originals, and for providing a different number of copy sheet output path inversions depending on whether an even or odd number of originals was detected in the first copying circulation. Also note that the copy of the first fed original is put in the duplex tray on the first circulation (Col. 5, lines 5–10), even if it is an odd page. This Nth-odd page must be fed on the second (and all subsequent) document copying circulations from the duplex tray to the output tray, i.e. undesirably fed back through the transfer/fixing station, where its blank back side may be contaminated, as described at Col. 5, lines 41–51, et al.

Further illustration of the odd last page problem is shown by the manual correction method with manual sheet insertion shown in the August 1976 "Research Disclosure" publication No. 14858, pp. 44–45.

However, N to 1 document recirculation has been commercially utilized in spite of these disadvantages because bottom feeding and top restacking is preferred for a "racetrack" document circulation path. The documents may be recirculated in a short over-platen loop to and from a document stack located over the copier platen, and the entire RDH may be in a pivotal platen cover unit. Documents can be fed from one edge of the stack to the same side or edge of the platen underneath the stack, and then back from the opposite edge of the platen to the opposite edge of the stack. The documents may be stream fed unidirectionally over the platen. One document may be fed on while the prior document is feeding off. The document path has a short 180° loop turn above each side of the platen. With a shorter and unidirectional document recirculation path, document transport speeds can be lower and/or the number of copy pitches skipped in copying small (2–6) sheet document sets can be reduced.

By way of further background as to known difficulties in integrating precollation document recirculation with duplex copying, in a properly collated set of duplex copy sheets the odd pages 1, 3, 5, etc., should normally appear on the first or front faces or sides. Only the next higher page number even pages 2, 4, 6, etc., should normally be on the respective second or back sides. The order of copying the document pages and the order of presenting the copy sheets to the images thereof must be coordinated to maintain proper page order for collation. Also, the number of duplex sheets will always be less than the number of pages on those duplex sheets. In contrast, in a set of simplex document or copy sheets, the number of the sheet will typically also correspond to the page number. Thus, an odd number of simplex sheets will normally also have a corresponding odd number of page images. However, a set of duplex sheets, regardless of the sheet count, may have either an odd or even number of pages. If there are an odd number of pages in the set of duplex sheets then the back side of the last sheet should normally be blank (clean). Other difficulties involved in efficient duplexing systems and sequences which are compatible with both simplex and duplex systems are discussed in the art cited herein and other duplexing art.

Of interest as relating to improved simplex/duplex precollation copying efficiency usable after the above-described precount circulation is U.S. Pat. No. 4,116,558, issued Sept. 26, 1978, to J. A. Adamet et al. That system is also described herein and in other above-cited patents. This Adamek patent teaches a more efficient RDH system for making duplex precollated copy sets usable with the present invention, and compatible with simplex copying, in which all of the simplex documents are copied on all but the first and last copying circulations. On the first and last copying circulations alternate simplex documents are copied (by circulating all documents but only exposing alternate ones) to form and remove an internal duplex copy buffer set of one-sided copies, as further explained hereinbelow.

Another form of collated duplex copying system usable with the present system is disclosed, for example, in U.S. Pat. No. 4,095,979 issued June 20, 1978 to A. B. DiFrancesco et al. In the latter type of duplexing system each copy sheet (and each duplex document) is turned over immediately for its second side image.

Some examples of further exemplary details of N to 1 or racetrack type recirculating document handlers are disclosed in U.S. Pat. Nos. 4,335,954 issuing June 22, 1982 to Russel L. Phelps; U.S. Pat. No. 4,270,746 issued June 2, 1981 to T. J. Hamlin; U.S. Pat. No. 4,324,395 issued Apr. 13, 1982 to Morton Silverberg and U.S. Pat. No. 4,076,408 issued Feb. 28, 1978 to M. G. Reid, et al. Further suitable exemplary RDH details (on a set separator/stack height sensor) are in U.S. Ser. No. 373,919 filed May 3, 1982 and art cited therein. Further examples of a preferred system of document sheet acquisition and initial feeding from the bottom of an RDH document tray are shown in U.S. Ser. Nos. 317,211, 317,212 and 317,219, all filed Nov. 2, 1981 by, respectively, John M. Browne and Gerald M. Garavuso all by the same assignee.

U.S. Pat. No. 4,078,787 issued Mar. 14, 1978 to L. E. Burlew et al. is noted as to plurally copying a single simplex document in an RDH without any circulation (since single page copy sets cannot, of course, be collated). Also noted in U.S. Pat. No. 4,093,372 issued June 6, 1978 to Joachim Guenther, teaching an RDH copying system which switches from a precollation to a post-collation mode of copying automatically in response to operator selection of a preset (larger) number of desired copy sets.

A brief anonymous Disclosure Number 19015 at page 61 of the "Research Disclosure" published February, 1980 by Industrial Opportunites, Ltd., Homewell, Havant, Hampshire, U.K. is noted for suggesting that when duplex original documents are being recirculatively copied onto duplex copy sheets (in a copying system where the duplex documents must be immediately inverted each time for copying opposite sides in immediate sequence) that the consequent copying speed loss can be compensated for to some extent by making two consecutive copies of the same original each time. However, it requires 2 copy receiver trays.

Even further details for the exemplary copier shown herein are disclosed in the following pending U.S. Patent Applications and foreign equivalents thereof: Ser. No. 372,581 filed Apr. 28, 1982 re optics; Ser. Nos. 420,965; 420,993 and 421,006 re controls all filed Sept. 21, 1982; Ser. No. 420,966 filed Sept. 20, 1982 re copy sheet feeders; and Ser. No. 193,228 filed Oct. 2, 1980 and Ser. No. 443,799 filed Nov. 22, 1982 [and U.S. Pat No. 3,856,295 issued Dec. 24, 1974 to J. H. Looney] re copy sheet inverters. Another inverter is shown in IBM Technical Disclosure Bulletin Vol. 18, No. 1, June 1975, p. 40.

Examples of various other patents teach known document handlers and copiers and control systems therefor, including document and paper path switches and counters, are U.S. Pat. Nos. 4,054,380; 4,062,061; 4,076,787; 4,099,860; 4,125,325; 4,132,401; 4,144,550; 4,158,500; 4,176,945; 4,179,215; 4,229,101; 4,278,344; 4,284,270 and 4,335,949. Conventional simple software instructions in a copier's conventional microprocessor logic circuitry and software of document handler and copier control functions and logic, as taught by the above and other patents and various commercial copiers, are well known and preferred. However, it will be appreciated that the document handling and other functions and controls described herein may be alternatively conventionally incorporated into a copier utilizing any other suitable or known simple software or hard wired logic systems, switch controllers, etc. Such software for functions described herein may vary depending on the particular microprocessor or microcomputer system utilized, of course, but will be already available to or readily programmable by those skilled in the art without experimentation from the descriptions and references provided herein.

In particular, the provision of two separate copy sheet supply trays in a copier and operator switch selection therebetween is well known per se from various of the above and other references and copiers.

The control of the exemplary document and copy sheet handling systems disclosed herein may be accomplished by conventionally activating them by signals from the controller direct or indirectly in response to simple programmed commands and from selected activation or non-activation of conventional copier switch inputs by the copier operator, such as switches selecting the number of copies to be made in that run, selecting simplex or duplex copying, selecting whether the documents are simplex or duplex, selecting a copy sheet supply tray, etc. The resultant controller signals may conventionally actuate various conventional electrical solenoid or cam controlled sheet deflector fingers, motors or clutches in the copier in the selected steps or sequences as programmed. Conventional sheet path sensors, switches and bail bars, connected to the controller, may be utilized for counting and keeping track of the positions of documents and copy sheets, as is well known in the art, and taught in the above and other patents and products. Known precollation copying systems utilize such conventional microprocessor control circuitry and connecting switches for counting the number of document sheets as they are circulated, counting the number of completed document set circulations, and thereby controlling the operation of the document and copy sheet feeders and inverters, etc.

All references cited herein, and their references, are incorporated by reference herein for appropriate teachings of additional or alternative details, features, and/or technical background.

The present invention desirably overcomes or reduces various of the above-discussed problems.

A general disclosed feature herein is to specially control the sequence of document and copy sheet feeding and copying so as to provide more efficient and rapid precollation duplex copying with a recirculating document handling system for normal copy sheets, yet also provide for proper duplex copying of special, oreintation restricted, copy sheets.

A preferred specific feature disclosed herein is to provide, in an automatic document handling system for recirculative precollation copying in reverse serial order of a set of simplex document sheets on a duplex copier to provide precollated simplex or duplex (two-sided) copies therefrom, with proper orientation of the document images on the copy sheets for copies made on preprinted, prepunched, or other special orientation restricted copy sheets, as well as for copies made on plain paper or other non-orientation sensitive copy sheets, and with counting means for counting the number of document sheets in the document set by the end of the first circulation thereof, the improvement wherein said copier has a special copy sheet supply means for said special orientation restricted copy sheets and a main copy sheet supply means restricted to said non-orientation sensitive copy sheets; first switching means for selecting between the feeding of copy sheets from said main copy sheet supply means or said special copy sheet supply means for said copies, second switching means for selecting between said simplex or duplex copying; and control means connecting with said first and second switching means and said document handling system for causing said document handling system to circulate the set of document sheets once before copying them to count them with said counting means and determine whether there are an odd or even number only in response to both said first switching means selecting said special copy sheet supply means rather than said main copy sheet supply means and said second switching means selecting duplex copying rather than simplex copying.

Another specific feature disclosed herein is to provide in an automatic document handling method for recirculative precollation copying of a set of simplex document sheets on a simplex and duplex copier to provide precollated simplex or duplex (two-sided) copies therefrom, with proper orientation of the document images on the copy sheets for copies made on preprinted, prepunched, or other special orientation restricted copy sheets, as well as for copies made on plain paper or other non-orientation sensitive copy sheets, and with counting the number of document sheets in the document set by the end of the first circulation thereof, and wherein said copier has at least two separate copy sheet supplies, the improvement comprising the steps of: loading said special orientation restricted copy sheets only into a special copy sheet supply and loading said non orientation sensitive copy sheets only into a main copy sheet supply, selecting between the feeding of copy sheets from said main copy sheet supply or said special copy sheet supply for making copies, selecting between said simplex or duplex copying, and automatically causing said document handling system to circulate the set of document sheets once before coyping them to count them and determine whether there are an odd or even number only in response to selecting said special copy sheet supply rather than said main copy sheet supply together with selecting duplex copying rather than simplex copying.

Further features which may be provided by the method and apparatus disclosed herein, individually or in combinations, include those wherein in response to said first switching means selecting said special copy sheet supply means rather than said main copy sheet supply means and said second switching means selecting duplex copying rather than simplex copying, the copying of said document sheets on said special copy sheets is controlled by copying an odd number of document sheets differently from an even number on at least the first copying circulation to maintain proper copy orientation on said special copy sheets, but in response to selecting said main copy sheet supply means no difference is made in copying document sheets on the first copying orientation between an odd or even number of document sheets, and copying is initiated on the first circulation of the document sheets and before they are all counted; and wherein said control means automatically resets said first switching means to select feeding from said main copy sheet supply means after each completion of copying of a document set onto copy sheets from said special copy sheet supply means.

Figure 2A:
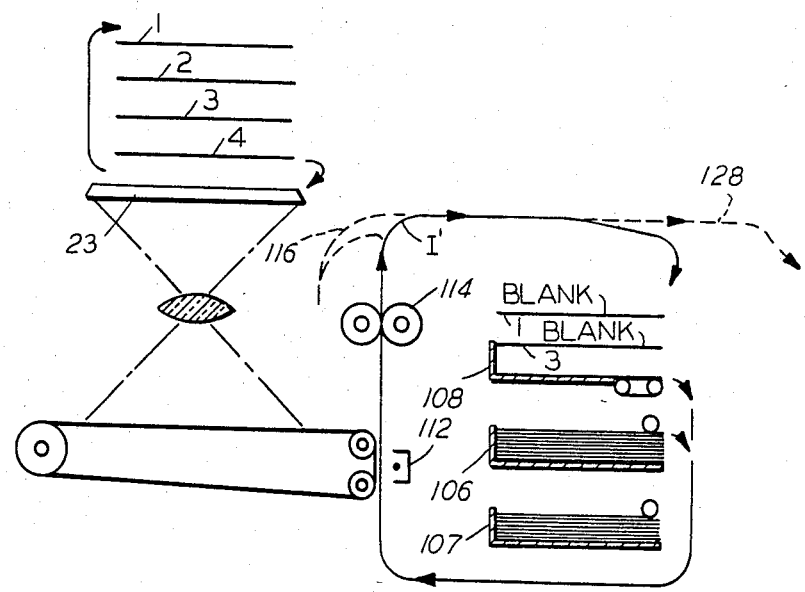
Figure 2B:
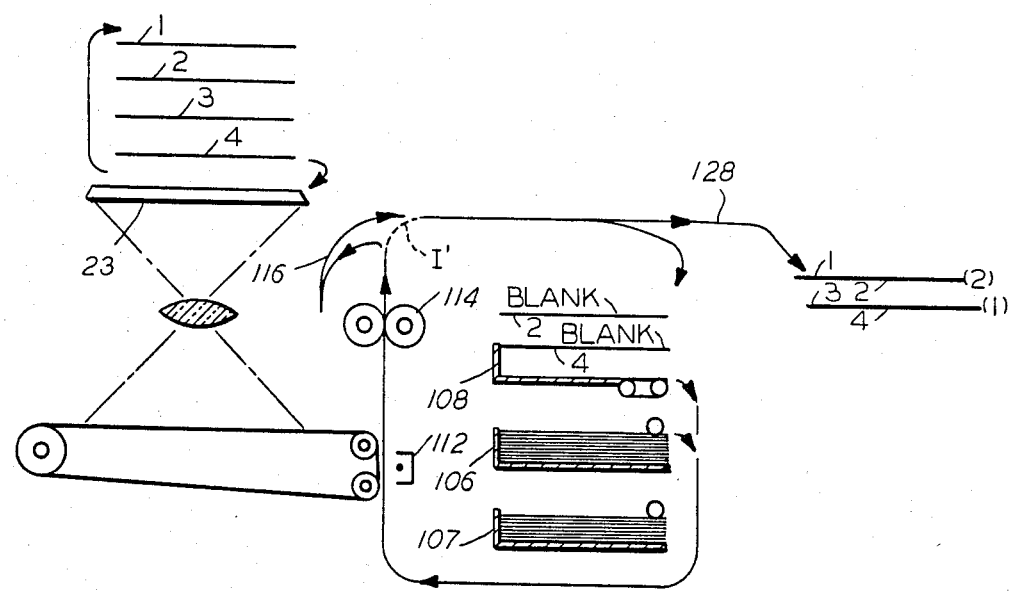

Various of the above-mentioned and further features and advantages will be apparent from the examples described hereinbelow of specific apparatus and steps of operation. The invention will be better understood by reference to the following description of one specific embodiment thereof, which includes the following drawing figures (approximately to scale) wherein:

FIG. 1 is a schematic side view of an exemplary copier and an exemplary recirculating document handler therefor with which the present invention may be practiced, and FIGS. 2a and 2b show schematic document and copy sheet paths and page positions for efficient N to 1 order simplex/duplex precollation copying on the apparatus of FIG. 1, for one specific example of a 4-page (4-sheet) simplex document set, at the end of the first (2a) and second (2b) document set circulations.

Referring first to the xerographic copier 10 and its automatic document feeding unit 20 shown in FIG. 1, it will be appreciated that they are merely one example, and that various other alternative recirculating document feeding units and copiers may be utilizes with the present invention, including various ones disclosed in the above-cited references.

In the exemplary N to 1 order recirculating document handler (RDH) 20 disclosed here, individual original document sheets are sequentially fed from a stack of document sheets placed by the operator face-up in normal forward collated order in the document stacking and holding tray 22, i.e. with page 1 on the top of the stack. Document sheets are fed from the bottom of the stack seriatim to the imaging station 23, which is the conventional copying platen of the copier 10, to be conventionally imaged onto a photoreceptor 12 for the production of copies in a generally conventional xerographic manner. The documents are stacked initially, and also restacked automatically during each circulation, in the tray 22 over the platen 23. The document handler 20 has conventional switches or other sensors such as 24 for sensing and counting the individual documents fed from the tray 22, i.e. counting the number of document sheets circulated. A conventional resettable bail or finger drops to indicate through its associated set-counter switch or sensor 26 the completion of each circulation of the complete document set, by sensing that all the documents have been fed out from under it, and then is automatically reset on the top of the stack before the next circulation. The document feeder 20 is adapted to continually serially recirculate the documents until a selected number of copy sets is made therefrom. The document sheets may be various conventional sizes and weights of sheets of paper or plastic containing information indicia to be copied on one or both sides, e.g. printed or typed letters, drawings, prints, photographs, etc. A bottom feeder 28 feeds from the stack the bottom-most document sheet, on demand by the controller 100, through one of two selected feed paths described below to a platen transport 30 which moves the document over the copier platen 23 into a registration position, against a registration gate 32 where the side of the document facing the platen 23 is copied.

In this document feeder 20 each document is selectably inverted or not inverted as it is fed from the tray 22 to the imaging station 23 through one of two paths selectable by the controller, a simplex document path and a duplex document path. This is accomplished here before the document is copied. The two paths here are provided by a selectably reversible sheet drive roller (inverting roller) 40 and a selectable position gate or deflector 60 in the document path. Each document sheet is fed initially from tray 22 around the outside of the roller 40. If the document path is continued around roller 40, it is fed invertedly through a first (simplex document) path 54 onto the platen 23.

The decision gate 60 in the document path here is adjacent the entrance to roller 40 and comprises pivotable, normally raised, deflector fingers which may be lowered after the trail edge of the document has passed this gate. (Switch 24 or another switch can sense the trail edge and start a count of sufficient time for it to pass). Subsequent actuation of the gate 60, together with coordinated reversal of the roller 40, causes the further recirculatory movement of the document to reverse and pass through a second and different (duplex) transport path 58 to the platen for copying. In the art this is called an "inverter" even though the document is not inverted at this point, as described below. The duplex document transport path 58 provides no sheet inversion between the stack and the platen, whereas the first transport path 54 inverts the document sheet (once) between the stack and the platen. The path 58 provides for inversion of duplex documents for copying both sides of a duplex document set, as described in detail in the cited U.S. Pat. No. 4,278,344.

In the inverter operation for path 58, the reversal of the roller 40 causes the documents to only go partially around the roller 40 and then be reversed in direction and fed directly back through the gate 60. The now deflecting down gate 60 (as shown in its solid line position in FIG. 1) deflects the document into the path 58 which feeds directly onto the platen 23. Thus, in this non-inverting path 58, the documents arrive at the platen with the same orientation as their original orientation in tray 22.

In contrast, the simplex document inverting transport path 54 transports the documents unidirectionally and without reversal fully around the roller 40 onto the platen 26. Thus, the orientation or facing on the copy platen 23 of documents fed through the simplex path 54 is inverted from the previous orientation of those documents in the tray 22.

It may be seen that the return path of the documents to the tray 22 from the platen after they are copied is always the same here, regardless of which of the two initial paths 54 or 58 is used. This document return path has one sheet inversion, provided by feeding the documents around a second, but non-reversing, inverting roller document feeding system 42, which also returns the documents to restack on the top of the stack in tray 22.

Thus, in the total recirculation path from the bottom of the tray 22 back to the top thereof, with the selection of the transport path 54 the documents are inverted twice around both rollers 40 and 42, whereas with the selection of the transport path 58 the documents are only inverted once. Therefore, it may be seen that the reversal or non-reversal of the roller 40 and the coordinate actuation or non-actuation of the selector gate 60 therewith during a document set circulation determines whether that set of documents will be recirculated with a total of one or two inversions in that circulation. (In either case, since the documents can be continuously restacked simultaneously with continuous feeding by the feeder 28, continuous multiple recirculations can be provided for precollation copying). With two total path inversions per circulation (i.e. utilizing the path 54), there is effectively no inversion per circulation. Thus, the documents will be restacked in the tray 22 in their same original orientation, and the same sides of the documents will be exposed in the next circulation. In contrast, with only one total path inversion per circulation (using the path 58) the documents will be restacked in the tray 22 inverted from their previous orientation. Thus, the apparatus of path 58 is referred to as the "inverter" because its total circulation path effect is inversion, even though its local effect is actually non-inversion as noted above.

In the method of precollation copying of a set of plural (multipage) simplex document sheets disclosed herein, the document sheets are presented to the imaging station 23 of the copier 10 in N to 1 or conventional reverser serial page order. They are multiply recirculated between the stacked set of the document sheets and the imaging station, and copied once on one side per circulation at the imaging station, by feeding the document sheets seriatim from the bottom of the stack to one side of said imaging station and then returning the document sheets from the opposite side of said imaging station at the top of said same stack, in a recirculatory loop path. The set of simplex document sheets are stacked, and restacked, in proper page order, face-up, with the first page on the bottom of the stack, in the stacking position 22 overlying the imaging station 23.

As noted, in the systems disclosed in the above-cited Adamak U.S. Pat. No. 4,116,558, Sahay U.S. Pat. No.

4,278,344, Smith et al. U.S. Pat. No. 4,330,197, etc. for making duplex copies from simplex document sheets in a desired manner, in the first copying circulation and the last copying circulation of the set of document sheets only every alternate document sheet is copied at the imaging station to fill and deplete a duplex tray buffer set, respectively, but in all other circulations all documents are copied, with alternate feeding from a main copy tray and the duplex copy tray. However, as taught in the latter patent that system requires a non-copying initial document circulation to determine whether documents being fed are odd or even for N to 1 (reverse order) document recirculation.

In the system here, no significant hardware changes are required and improved efficiency but fully compatible precollation copying may be provided with the same disclosed document handler and copier merely by providing an additional or modified program in the copier programmer and operator copy sheet loading steps (restraints) described herein to provide a more efficient process of duplex copying of simplex document pages onto most copy sheets.

The operation of inverter mechanisms utilizing a sheet reversal path can increase reliability problems, particularly if it must be frequently used. The present system does not require any use of the duplex document transport path 58 for simplex documents, nor does it require frequent use of a copy sheet inverter e.g. 116. Furthermore, this system is fully compatible with duplex document recirculation without increasing the number of copy sheet inverter operations.

The exemplary copier 10 processor and its controller 100 will now be described in further detail. The copier 10 conventionally includes a xerographic photoreceptor belt 12 and the xerographic stations acting thereon for respectively charging 13, exposing 14, developing 15, driving 16 and cleaning 17. The copier 10 is adapted to provide duplex or simplex precollated copy sets from either duplex or simplex original documents copied from the same RDH 20. Two separate copy sheet trays 106 and 107 are provided for feeding clean copy sheets selectably from either one. They are normally known as the main tray 106 and auxiliary tray 107. However, in this system they have different (restricted) functions. The control of all sheet feeding is, conventionally, by the machine controller 100.

The controller 100 is preferably a known programmable microprocessor, exemplified by the art cited above, which conventionally also controls all of the other machine steps and functions described herein including the operation of the document feeder, the document and copy sheet gates, the feeder drives, etc. As further disclosed in those references, the controller 100 also conventionally provides for storage and comparison of the counts of the copy sheets, the number of documents recirculated in a document set, the desired number of copy sets and other selections by the operator through the panel of switches thereon, time delays, jam correction control, etc.

The copy sheets are fed from the selected one of the trays 106 or 107 to the transfer station 112 for the conventional transfer of the xerographic toner image of a document page to the first side of a copy sheet. The copy sheets here are then fed by a vacuum transport to a roll fuser 114 for the fusing of the toner image thereon. From the fuser, the copy sheets are fed onto a gate or fingers 118 which functions as an inverter selector. Depending on the position of the gate 118 the copy sheets will either be deflected into a sheet inverter 116 or bypass the inverter 116 and be fed directly on to a second decision gate 120. Those copy sheets which bypass the inverter 116 (path I') turn a 90° corner in the sheet path which inverts the copy sheets into a face-up orientation before reaching another gate 120. Thus, the image side which has just been transferred and fuxed is face-up at this point. If the inverter path 116 is selected the opposite is true (the last printed face is face-down at this point).

This second decision gate 120 then either deflects the sheets directly into an output tray 122 or deflects the sheets into a transport path which carries them on without further inversion to a third decision gate 124. This third gate 124 either passes the sheets directly on without inversion into the output path 128 of the copier, or deflects the sheets into a duplex inverting transport 126 if duplex copying is being done. The inverting transport 126 inverts and then stacks copy sheets to be duplexed in a duplex tray 108 when the gate 124 so directs.

The duplex tray 108 provides intermediate or buffer storage for those copy sheets which have been printed on one side and on which it is desired to subsequently print an image on the opposite side thereof, i.e. copy sheets in the process of being duplexed. Due to the sheet inverting by the roller 126, these buffer set copy sheets are stacked into the duplex tray 108 face-down. They are stacked in this duplex tray 108 on top of one another in the order in which they were copied.

For the completion of duplex copying, the previously simplexed copy sheets in the tray 108 are fed seriatim by its bottom feeder 109 back to the transfer station 112 for the imaging of their second or opposite side page image. This is through basically the same copy sheet path (paper path) as is provided for the clean (blank) sheets from the trays 106 or 107. It may be seen that this copy sheet feed path between the duplex tray 108 and the transfer station 112 has an inherent inversion which inverts the copy sheets once. However, due to the inverting transport 126 having previously stacked these buffer sheets printed face down in the tray 108, they are re-presented to the photoreceptor 12 at the transfer station 112 in the proper orientation, i.e. with their blank or opposite sides facing the photoreceptor 12 to receive the second side image. This is referred to as the "second pass" for the buffer set copies being duplexed. The now fully duplexed copy sheets are then fed out through the fuser 114 and past the inverter 116 to be stacked in tray 122 or fed out past the gate 124 into the output path 128.

The output path 128 transports finished copy sheets (either simplex or duplex) to another output stacking tray or, preferably, to an on-line finishing station. There the completed precollated copy sets may be finished by stapling, stitching, glueing, binding, and/or off-set stacking.

As disclosed, for example in the above-cited Sahay U.S. Pat. No. 4,278,344, etc., a preferred simplex/duplex precollation system (for making duplex copies from simplex document sheets) is as follows: For N-1 (reverse page order) copying there is a first non-copying precount circulation by RDH 20 to count the number of simplex document sheets. Then in the second circulation (first copying circulation) of the document set only alternate document sheets (e.g., only the even pages) are copied at the imaging station 23 to make and fill duplex tray 108 with a buffer set of half-completed duplex copies. Then in all subsequent copying circulations (except the last) all of the document sheets are copied, but onto sheets fed alternately from copy tray 106 (or 107) and duplex tray 108. Those documents copied onto sheets from tray 106 or 107 are being temporarily placed in tray 108 for the next circulation (except for an Nth odd page) at the same as those documents copied onto the sheets fed out from tray 108 are being outputted as completed duplex copies. In the final document circulation only the other alternate document pages not copied in the first copying circulation are copied. They are copied onto sheets fed only from the duplex tray 60, to deplete the buffer set from duplex tray 108.

A preferred compatible duplex/duplex precollation system (for copying duplex documents onto duplex copy sheets) is also taught in said Sahay U.S. Pat. No. 4,278,344. No precount circulation is required, but the number of document sheets in the document set is counted in the first (copying) circulation. Only one side (e.g. only even page sides) of the duplex document sheets are copied in the initial circulations. The copies of this one side are stored as an intermediate buffer set in duplex tray 108. After a calculated integral number of said initial document set circulations corresponding to a desired maximum number of copies to be accumulated in said buffer set (e.g., 14 divided by the number of document sheets counted plus 1) the duplex documents are inverted during the next copying circulation, and then the other sides of the duplex documents are copied in an equal number of subsequent circulations onto the copy sheets from duplex buffer tray 108 and outputted as completed duplex copy sets. When the tray 108 is depleted the documents are inverted again and the above-described cycles are repeated until the desired number of copy sets are completed.

A compatible duplex/simplex copying system is taught in the above-cited Hamlin et al. U.S. Pat. No. 4,229,101. The duplex documents are always copied onto only one side of only clean copy sheets from trays 106 or 107. The simplex copies of one side of the duplex documents are placed in duplex tray 108, and then may be fed out through the normal duplex copying path 62, but without being imaged on their other sides, and being fed alternately (interleaved) with simplex copies made of the other sides of the documents from trays 46 or 47.

In the system here, no copier 10 hardware changes are required. Improved speed but fully compatible precollation copying may be provided with these same basic above-described copying systems at the same imaging station merely by applying a partially different selectable software program to the controller 100 to provide a partially different process of feeding and copying or not copying selected document pages from the RDH 20 here.

If alternative non-precollated output is provided, as by using the RDH 20 in a known semi-automatic stream feeding mode utilizing only platen transport 30, or alternative manual document placement, then the output path 128 may alternatively connect to a sorter. The sorter can have an inherent sheet path inversion if 1 to N order document presentation order is used.

It is desirable to minimize the operation of the copy sheet output inverter 116, in order to simplify and shorten the paper path and increase its reliability. Its use also depends on the inherent inversions provided within the paper path of the copier. The exemplary conventional inverter 116 here operates by the gate 118 deflecting a copy sheet face-down into the first or lower nip of the illustrated three roll inverter, which drives the sheet fully into the inverter chute. The copy sheet's forward movement may then be stopped and reversed within the inverter chute by known or suitable sheet reversing means, e.g., further rollers and/or resilient rebound members (see the above-cited references thereon, for example). The reversed copy sheet is then driven out of the inverter 116 through the second or upper nip of the same three roll inverter directly toward the gate 120. The curved shape of the inverter chute acting on the beam strength of the sheet causes the sheet trail edge to flip up toward this second nip. The copy sheet ouput from the inverter 116 to the gate 120 here is thereby last-printed-face-down. Note that the inverter 116 here is positioned at a corner of an otherwise inherent 90° paper path inversion as described above. However, any other suitable sheet inverter may be utilized, and may be provided at different positions in the copy sheet output path.

By way of further background as to the difficulties in copy sheet output orientation and order for precollation, for which the inverter 116 may be utilized, there are several known problems and solutions in maintaining the proper collation of the copy sheets in the output tray or finisher, particularly with reproducing machines which must do both simplexing and duplexing, as discussed in the cited U.S. Pat. No. 4,278,344 and elsewhere. Collated duplex copying output presents particular output collation difficulties and requirements, depending on which side is printed last, etc. As noted above, on each duplex copy sheet a lower and odd, document page number must be on one side of the copy sheet and the next higher, and even, document page number must be on the opposite side of that copy sheet. Thus, with N to 1 copying the last-printed page in each set is always page two printed on the back of the page one sheet, or vice versa, and this last duplex copy sheet is exited with page 2 down. In each completed set of copies the outputted duplex copies as picked up by the operator should be in the proper precollated page order 1/2; 3/4; 5/6; etc., even though they were copied in the reverse page number order, and even though odd page sides may be printed before even page sides, or vice versa, depending on the system selected.

Providing properly collated output without normally using an inverter is made more difficult for duplex copies by the fact that the total overall copy sheet path for the copies being duplexed is typically different, i.e., contains more inversions, than the overall copy path for copy sheets which are only being simplexed, since it is necessary to turn the duplex copy sheets over to present their opposite sides for their second copying pass. In the particular duplex sheet path herein each sheet to be duplexed is inverted once at the duplex tray input 126, a second time in the return path to the transfer station 112, and a third time in the path from the transfer station 112 to the output 128, to exit last-printed-face-up, unless the inverter 116 is used. Thus, if the second sides printed are the odd sides, a N to 1 output may be stacked with these last-printed odd sides facing up without using inverter 116. If, alternatively, the last-printed sides are even pages the duplex copy output may be inverted at 116 or elsewhere in the output to maintain collation. However, it is desirable to have commonality, i.e., to utilize the same sheet feeding path to the maximum extent possible for both duplex and simplex copies, and to normally avoid using a selectable output inverter 116 for either. Yet it is also desirable to avoid having the operator manually reload (turnover) format sensitive copy paper between simplex and duplex copying jobs to provide proper output orientation.

In FIG. 2 et al. the inverter 116 path is illustrated in solid lines when used, and shown as the alternative path in dashed lines. However, as otherwise discussed herein, it is normally bypassed (path I') here by gate 118. This same path I', avoiding the inverter 116, is also used for simplex copies, which is an important advantage.

Further, by way of background, there is an additional problem in the situations where there are an odd rather than even number of simplex document pages to be copied onto a duplex copy set. With an odd number of document pages the Nth or first-copied page of the set of duplex copies made therefrom in N to 1 order is really a simplex copy. That is, in the completed copy sets the bottom copy sheet will have an image on only one side (of the odd Nth page) and a blank opposite side. I.e. it is actually a simplex copy sheet even though part of a duplex copy set. It is undesirable to run this Nth odd page only copy sheet through the transfer station a second time for the pseudo printing of a blank image on the back side thereof simply to obtain an additional inversion of that sheet to maintain output collation, since this wastes processing time and also can cause undesirable background contamination of the blank side of this sheet. [However, it can be handled this way if desired.] This can be avoided by printing the Nth odd page on a clean sheet from tray 106 or 107 and directly outputting it immediately after its first side is printed rather than feeding it from or into the duplex tray 108. This normally results in this particular copy sheet having a different number of inversions, as discussed, but this particular sheet can then be inverted by the inverter 116, if needed, to provide proper collation with the rest of the copy set pages.

However, heretofore to treat an odd Nth copy page differently in this manner, and also to know whether the first duplex buffer set in tray 108 comprises odd or even pages, (so as to maintain output collation) it was considered essential to know in advance whether there are an odd or even number of simplex documents. This required a document pre-count cycle.

That is, where simplex documents are copied in reverse serial order (N to 1) the first document fed is page N and the first (Nth) duplex copy sheet will be the one requiring special duplex processing, i.e., needing a blank back side when N is odd. Since this Nth copy sheet is fed first it is not known whether this Nth document page is odd until *after* the entire set of documents has been counted.

Orientation sensitive copy sheets, e.g. pre-printed, letterhead, binder hole or the like copy sheets, present a special problem. They normally cannot have a first even page printed on the front of a pre-printed side. Nor can they be imaged upside down to any pre-printing. E.g., page 1 must be on a letterhead side and oriented with the pre-printing orientation. Nor can a last Nth odd page be inverted relative to pre-printing or printed only on its back side. Nor can binder holes be on the right side of a page rather than in the left margin. This is an additional complication for duplex copying, particularly for the above-described Nth odd page problem. As noted above, it is also important to be able to use common stack orientation for alternative simplex copying on the same special (orientation sensitive) copy sheets without reloading. I.e. without having to turn the stack of special copy sheets in tray 107 over to switch from duplex to simplex copying.

For proper simplex/duplex copying, by loading letterhead paper face-up in the tray 107 and copying odd page documents on the first pass (to put odd page copies in the duplex tray 108) the odd pages will be properly printed on the front or letterhead sides of the letterhead copy sheets here, since the copy paper path here contains one inversion between trays 106 and 107 and the transfer station 112. Then on the next circulation these duplex copy sheets will have even pages properly printed on their back sides. However, this requires knowing in advance whether odd or even pages are being copied, i.e. requires a pre-count circulation of the document set. However, for edge oriented pre-punched binder holes and certain other special papers this technique will not provide proper (common) sheet orientation of an odd Nth page duplex copy sheet, if the above described special (simplex copying) treatment of said odd Nth page sheets is provided, in which this sheet is outputted directly rather than recirculated back through the duplex tray 108.

It has been suggested that there be additionally provided a "special paper" or the like operator button on the copier console for the controller 100. The controller could then be programmed to detect the coincidence of signals from (1) this "special paper" button being pressed and (2) "simplex documents" and (3) "duplex" buttons also having been pressed. Upon detection of all of these conditions the controller 100 could direct special processing. However, this would undesirably require an extra switch and an extra operator step to provide properly oriented collated output. It would also require some sort of different (unspecified) copying system.

Turning now to the improved system disclosed herein, in contrast to the above, the present system does not require any additional operator intervention in the copying process. Yet the present invention automatically provides proper orientation of the document image on the copy sheet, and, in the vast majority of copy runs, eliminates any need for a pre-count cycle. Thus, with the present system, for most copying runs, the copier 10 and document handler 20 automatically begin copying the document images on the very first document circulation. This greatly improves the first copy set output time for most simplex/duplex copying. The pre-count cycle is initiated, automatically, only for orientation restricted copy sheets. This is provided by a system integrating the operation of the two copy sheet trays 106 and 107 with simplex/duplex operation. Only the auxiliary copy sheet tray 107 is utilized for special, orientation-restricted, copy sheets. However tray 107 may alternatively be utilized as a supply of conventional or non-orientation-restricted copy sheets without any change in the system described herein. However the main copy sheet supply 106 is restricted to conventional, i.e. non-orientation-sensitive, copy sheets.

This loading step restriction is preferably accomplished by automatically instructing the operator in the proper loading of copy sheets into the supply trays 106 and/or 107. Note that this instruction need only be given on those occasions when the trays 106 or 107 have run out of copy paper and must be reloaded, or are otherwise opened (slid out on their modular drawer units) for loading. Conventional switches connecting between the trays 106 and 107 and the controller 100 conventionally indicate these conditions. Program software in the controller 100 will then indicate verbally and/or pictorially on the controller display screen which tray (107) to load with special paper, and the orientation of that paper e.g. the facing and heading of letterhead paper and the left or right hand side orientation of pre-punched paper. The correct tray may be indicated as a flashing schematic component on the screen. Pending U.S. Application Ser. No. 420,963 filed Sept. 21, 1982 and the art cited therein is noted by way of example. A flashing light at the tray location inside the copier itself may also be provided. However, for normal copying operations (except when paper is loaded), these instructions and displays would not be present, so as not to confuse the operator.

There would also be no interference by the present system with the normal ability of the operator to select between (by a switch 200 and line 201 or the like) which of the two trays 106 and 107 are utilized to feed copy paper for processing. However, as is known, the copier would be preprogrammed in the controller 100 to normally feed copy sheets only from the main copy tray 106 unless such a switch 200 selection were made for the feeding from the auxiliary tray 107. A separate switch 200 is shown in FIG. 1 for illustration. However it will be appreciated that it need not be a dedicated switch and may be part of the regular controller 100 selector panel arrangement.

Since in normal copying the copy sheets will be automatically fed from the tray 106, and since the operator is instructed not to load special paper in this tray 106, the copy sheet duplexing orientation is uncritical for copy sheets from tray 106. Accordingly, the pre-count or initial non-copying circulation of the document set may be automatically eliminated in all cases of feeding of copy sheets from the main tray 106 with the present system, as further discussed herein.

Preferably if there is a switch 200 selection of feeding of copy sheets from the special or auxiliary tray 107, this selection must be remade at the beginning of each run. That is, preferably the controller 100 automatically resets by internal switching to automatically select feeding from the main tray 106 again after the completion of every copying run even if the prior selection was from the tray 107.

Expressing the presently disclosed system another way, in the present system the controller 100 causes the document handling system 20 to circulate the set of document sheets once before copying them to count them and to determine whether there are an odd or even number of documents only in response to the combination of two events: the operator selection of feeding of copy sheets from the auxiliary tray 107 rather than the main tray 106 *and* the selection by the operator of duplex copying rather than simplex copying. Then, and only in response to that combination, the copying of document sheets onto the special copy sheets fed from the tray 107 is controlled, using said pre-count information, to maintain proper copy sheet orientation, i.e. an odd number of document sheets is copied differently onto these copy sheets than an even number of document sheets.

An additional system, desirably integrated with the above, will now be described. Note that for simplex to duplex copying situations where copy sheets are fed to be duplexed from the main tray 106, that, since the pre-count cycle has been eliminated, it will not be known in the first copying circulation whether the first copied (Nth page) copy sheet will have an image on one or both sides thereof, since it is not known at this point in time whether there are an odd or even number of document pages. This does not provide information for special simplex treatment for an Nth odd page copy sheet as described above. However, the following additional novel system may be utilized to overcome this problem.

This additional system operates by making an initial assumption or guess as to whether there are an odd or even number of simplex document pages. That is, assuming, for purposes of the first document circulation only, that there are an odd number of document pages, or assuming that there are an even number of pages. At the completion of the first circulation of the document set which is the first copying cycle in this case (since there is no pre-count cycle), there will be an actual count of the number of simplex sheets and therefore it will be known whether or not this initial assumption was correct. Thus, if the initial assumption was erroneous, and this error can be corrected on the next circulation, then all subsequent circulations can be in the normal manner. This initial assumption, and the odd vs. even page copying mode based on that assumption, depends on the type of duplexing system desired. I.e. whether it is desired to normally have odd or even buffer set pages in the duplex tray 108.

Expressing this another way, with this system, the controller 100 makes an initial assumption that there are an odd (or even) number of simplex documents. If that initial assumption is determined to be wrong by the document set counter 24, 26 at the end of the first copying circulation, it is known that undesired pages are in the duplex tray 108 at the end of the first circulation. This new system utilizes the knowledge of this assumption error as follows: the document pages (even or odd) which were not copied on the first circulation, and should have been, are now copied twice on the second circulation of the document set. One of these two copy sets forms the first duplex copy set. The inverter 118, 116 is then used to handle the first duplex copy set output i.e. to provide proper collation. Meanwhile the other of these two copy sets is placed in the dedicated duplex tray 108. I.e. the tray 108 is being filled on the second circulation with the proper (known) choice of pages (even or odd depending on whether the copying system is based on placing odd or even pages in the duplex tray 108).

Describing this high productivity method in further detail, reference may be had particularly to the example in FIG. 2. On the first circulation of a simplex document set for duplex copying, alternate documents are copied (before all the documents are counted) in reverse or N to 1 order as if a pre-count cycle count had been made. The controller makes a programmed assumption as to *which* alternate documents are copied in the first circulation. That is, if the controller 100 makes the assumption that there are an even number of pages and that the system would like to have even numbered pages in the duplex tray 108, then the copier controller 100 will operate to copy on the first circulation the following documents: N, N-2, N-4, etc., in that sequence as described in the above-cited U.S. Pat. No. 4,330,197. If this assumption that there were an even number of document pages is correct, the copy pages in the buffer set in the tray 108 will in fact be even pages, and copying may proceed normally per said system. Alternatively, the controller 100 may be set to the assumption that there are an even number of documents and that odd pages were desired in the tray 108, and thus copy the documents in the alternate sequence: N-1, N-3, N-5, etc. in the first circulation. It may be seen that there are 4 possible combinations of these two initial assumptions, but only the above 2 possible copying *sequences.*

Thus, at the end of the first circulation of the documents, the duplex tray 108 will contain a set of odd or even pages depending on the actual (odd or even) number of document pages and also on the copying assumptions made (and the consequent choice of one of the two copying sequences above) which will generally correspond to whether it is desired to place even or odd pages in the duplex tray for a correct assumption. As indicated, if the assumptions correspond to the desired (odd or even) pages being placed in the document tray correspond to the actual document count, then after the first circulation copying will proceed normally, i.e. as if a pre-count cycle had actually been conducted first.

The preferred first copying sequence is N-1, N-3, N-5, etc., as further discussed below. This assumption, that there are an odd number of document pages and that it is desired to place even pages in the duplex tray 108, avoids feeding either an Nth odd page or a blank page into the duplex tray 108 regardless of whether the actual Nth document is odd or even. I.e. the first-fed document sheet is not copied on the first document circulation.

However, if it is determined at the end of the first circulation that an initial assumption was wrong, then the wrong set of pages will be in the duplex tray 108 at the end of the first circulation. [See the example in FIG. 2a.] This is taken care of by this system providing a special copying sequence for the second circulation of the documents. [Compare FIG. 2b with FIG. 2a.] This special copying sequence provides a different than normal copy sheet inversion and therefore would not normally be suitable for orientation-restricted copy sheets. However, it can be used here in all cases because of the restriction of copying in this special sequence to copying only from the main paper tray 106 and that tray's restriction to normal copy paper. I.e. the immediately above and below described special system or routine is automatically disabled (not used) for special paper copying from tray 107.

On only this special sequencing second duplex document circulation for a wrong document count initial assumption, only those document pages which were not copied in the first circulation are copied, and they are copied *twice* on the second circulation. That is, if odd page copies are in tray 108 at the end of the first document circulation when even pages were desired there, the *two* copies of each even page (only) are made automatically in the second document circulation. One of these two twice-copied images is placed on the back of the copy sheets fed from the duplex tray 108 so as to complete a first duplex set. This first copy set is fed out through the inverter 116 so as to be properly oriented at the output 128. That is, this first or "error" copy set, having been made in a different (odd/even) order than desired for the other copy sets, must be differently inverted in the output to provide proper collation during this second circulation of the document set. Meanwhile, the other (identical) image of the twice-copied images is placed on clean copy sheet from the tray 106 and fed into the duplex tray during this same (second) document circulation. This fills the duplex tray 108 with the *desired* (odd or even) pages for use in the subsequent document set circulations and duplex copy sets. After this special "error correcting" second document set circulation (which provides the first copy set output) simplex/duplex copying proceeds normally for all subsequent selected document set circulations as if no "error" (wrong "odd/even" assumption) had occurred in the first circulation.

Note that in the preferred higher productivity "error correction" mode, since only documents N-1, N-3, etc. were copied on the first document set circulation, only documents N, N-2, N-4, etc. are copied on the second document set circulation, but each is copied twice. That is, two consecutive flashes or scans are made of document page N, then document N-1 is fed across the platen without being copied, then two copies are made of document N-2, then document N-3 is also fed but skipped, then N-4 is fed and copied twice, etc. While there may be one or two skipped copying pitches for the uncopied documents, none are skipped for the dual-flashed documents, and thus the overall productivity loss for this second circulation is much less than the prior system of an entire non-copying circulation before the first copying circulation. Also this error correction second circulation will only occur half or less than half the time.

Note that an alternative to the above error correction system is simply to automatically display on the control panel to the operator an instruction to throw away the first copy set in the event that the initial assumption in the first circulation as to whether the document pages were odd or even was erroneous. Although much less desirable, this is not actually a great productivity loss, because this will occur only about one/half of the time in only the simplex to duplex copying mode. However it does require manual operator intervention. This alternative can be used in the event that it is necessary to feed certain special papers from both the trays 106 and 107, because in that case the different inversion of the first copy set in this error correction mode may provide a misoriented paper first copy set e.g. misorientation of special paper binder holes. However, even this can be eliminated by providing a "special paper" button, the actuation of which causes a precount cycle in this case, if desired. However, with the immediately above described correction system, and restriction of special paper to the tray normally not used, no loss of any first copy sets is required in exchange for eliminating the pre-count cycle, nor is actuation of any additional button required. There is no manual document or copy handling by the operator, and only a slight potential loss of productivity in only the second circulation of only approximately half the simplex/duplex cases.

Referring to FIG. 2, as one specific example of the above-described high productivity mode, a set of four simplex document sheets (pages 1, 2, 3, 4) is placed in the over-platen RDH to be duplex copied. I.e. an even number of document pages. Copy sheet feeding is from the main tray 106 and thus the precount cycle is automatically eliminated by the present system. The controller 100 assumes here on the first document circulation that there are an odd number of documents and that it is desired to place even pages in the duplex tray 108. Thus, the pages N-1, N-3 are copied on the first circulation, as discussed. But here there were actually an even number of document pages. Thus, at the *end* of the first circulation of the document set, as shown in FIG. 2a, the odd pages 3 (N-1) and 1 (N-3) of the document set (the wrong pages) have been copied and placed in the duplex tray 108. Also at the end of this first document set circulation it is now known that the initial assumption that there were an odd number of document pages was incorrect in this example. I.e. the set counter has completed counting the documents and determined that the total number in the set was even, i.e. the Nth page (4) is even. Accordingly, the above-described correction routine must be used for the second document circulation. FIG. 2b illustrates the condition of this special copying system at the *end* of the second circulation for this example. By the end of the second circulation, two copies each have been made of (only) the even document pages 4 and 2. One copy of page 4 and one copy of page 2 are placed in the duplex tray 108 as shown. The other copy of page 4 was printed on the back side of the sheet from buffer tray 108 having page 3 and outputted via inverter 116, so that page 4 is face-down and page 3 is face-up. The other copy of page 2 was then placed on the opposite side of the page 1 fed next from the duplex tray 108 and likewise inverted at 116 and outputted with page 2 down (and on top of page 3) and page 1 up. Thus a proper collated duplex output set of pages 1/2, 3/4, on two sheets, is provided at the end of the second circulation as shown in FIG. 2b. Also as previously indicated, by the end of the second circulation only the desired buffer set pages (even page sheets 2 and 4 in this case) are in the duplex tray 108 for subsequent duplexing in the normal manner.

On the third and all subsequent (except last) document circulations (a number depending on the selected number of copy sets desired) *all* of the document pages may be copied. Thus, in this example, the even pages (2, 4) will be copied once in each document circulation and placed in the duplex tray 108 concurrently with the odd pages (3, 1) being copied onto the opposite sides of the even pages placed in the duplex tray on the previous circulation. These subsequent completed duplex copy sheets will all be outputted with the last printed (odd pages) face-up, i.e. without requiring any inversion in the inverter 116. Thus for all copying except the second circulation the alternative (non-inverting) direct output path I' is utilized. Then, as described in the above-cited patents, on the *last* document circulation the buffer set is depleted (not replaced) by copying only the odd pages (in this example) onto the even pages from the duplex tray to form the final duplex copy set.

If in the above example there had been three original documents instead of four, then the initial assumption of there being an odd number of documents would have been correct. Thus this same exemplary copying sequence would have placed only the N-1, i.e. the even page 2 buffer sheet, in the duplex tray 108 in the first circulation, and, since that assumption was correct, likewise in all subsequent circulations. The Nth odd page, page 3 here, would not be copied in the first circulation. In the second and all subsequent circulations, page 3 can be copied onto a blank sheet fed directly from tray 106 rather than from the buffer tray 108 because it is now known that it is a simplex sheet. Only page 1 has to be copied onto the back of page 2 fed from the buffer tray 108 to form a complete copy set. This demonstrates the desirability of this copying sequence assumption, since otherwise page 3 would have been undesirably copied in the first circulation and put into the buffer tray 108.

As indicated above, the preferred document copying sequence assumption for the first document set circulation in this high productivity system is N-1, N-3, N-5, etc. I.e. copying the next-to-last and subsequent alternate documents. In this manner, even if the last (Nth) document was odd, it will not be copied during the first document circulation irregardless of whether there were actually an odd or even number of documents. With this preferred sequence, if the actual number of documents were even there will be odd pages in the duplex tray at the end of the first circulation, but this can be changed, if desired, by the second circulation correction method described above. If the actual number of documents was odd then even pages will be in the duplex tray with this preferred initial copying sequence N-1, N-3, N-5 etc. But in either case, the Nth page is not copied on the first circulation, so an Nth odd sheet will never be placed in the buffer tray 108.

The disclosed copier and document handler unit can automatically handle a wide variety of original document sets with a minimum of operator interaction. In a typical job, the operator need only drop the set of documents to be copied into the open loading tray 22 on top of the RDH 20, program the desired number of copies to be made in the controller 100 switches, indicate if duplex documents rather than simplex have been loaded; select duplex v. simplex copying if that choice is provided (by pressing a switch connected to the controller 100), and then initiating the copying run sequence by pressing the conventional "start print" button on the controller. Except for jam clearance, there would normally be no other operator interaction required with the copier or document handler to provide precollated output sets. The only restriction is that if special (restricted orientation) copy sheets are used they should be in the auxiliary paper tray 107 and not in the main paper tray 106, and feeding from that tray 107 must be selected (200, 201) by the operator for that copying run. Otherwise feeding from main tray 106 will be automatically selected by the controller 100.

While the N to 1 simplex document/duplex copy precollation copying system embodiment disclosed herein is preferred, it will be appreciated that this embodiment is but one example, and that various alternatives, modifications, variations or improvements thereon may be made by those skilled in the art from this teaching which are intended to be encompassed by the following claims:

What is claimed is:

1. In a copier with an automatic document handling system for recirculative precollation copying, in reverse serial order, of a set of simplex document sheets to provide precollated simplex or duplex (two-sided) copies therefrom, with proper orientation of the document images on the copy sheets for copies made on pre-printed, prepunched, or other special orientation restricted copy sheets, as well as for copies made on plain paper or other non-orientation sensitive copy sheets, and with counting means for counting the number of document sheets in the document set by the end of the first circulation thereof, the improvement wherein:

said copier has a special copy sheet supply means for said special orientation restricted copy sheets and a main copy sheet supply means restricted to said non-orientation sensitive copy sheets, first switching means for selecting between the feeding of copy sheets from said main copy sheet supply means or said special copy sheet supply means for said copies, second switching means for selecting between said simplex or duplex copying, and control means connecting with said first and second switching means and said document handling system for causing said document handling system to circulate the set of document sheets once before copying them to count them with said counting means and determine whether there are an odd or even number only in response to both said first switching means selecting said special copy sheet supply means rather than said main copy sheet supply means and said second switching means selecting duplex copying rather than simplex copying.

2. The document handling system of claim 1 wherein, in response to said first switching means selecting said special copy sheet supply means rather than said main copy sheet supply means and said second switching means selecting duplex copying rather than simplex copying, the copying of said document sheets on said special copy sheets is controlled by copying an odd number of document sheets differently from an even number on at least the first copying circulation to maintain proper orientation of said special copy sheets, but in response to said first switching means selecting said main copy sheet supply means no difference is made between an odd or even number of document sheets in copying document sheets on the first copying circulation, and copying is initiated on the first circulation of the document sheets and before they are all counted.

3. The document handling system of claim 2 wherein said control means automatically resets said first switching means to select feeding from said main copy sheet supply means after each completion of copying of a document set onto copy sheets from said special copy sheet supply means.

4. The document handling system of claim 1 wherein said control means automatically resets said first switching means to select feeding from said main copy sheet supply means after each completion of copying of a document set onto copy sheets from said special copy sheet supply means.

5. In an automatic document handling method for recirculative precollation copying of a set of simplex document sheets on a simplex and duplex copier to provide precollated simplex or duplex (two-sided) copies therefrom, with proper orientation of the document images on the copy sheets for copies made on pre-printed, prepunched, or other special orientation restricted copy sheets, as well as for copies made on plain paper or other non-orientation sensitive copy sheets, and with counting the number of document sheets in the document set by the end of the first circulation thereof, and wherein said copier has at least two separate copy sheet supplies, the improvement comprising the steps of:

loading said special orientation restricted copy sheets only into a special copy sheet supply and loading said non orientation sensitive copy sheets only into a main copy sheet supply, selecting between the feeding of copy sheets from said main copy sheet supply or said special copy sheet supply for making copies, selecting between said simplex or duplex copying, and automatically circulating the set of document sheets once before copying them to count them and determine whether there are an odd or even number only in response to selecting said special copy sheet supply rather than said main copy sheet supply together with selecting duplex copying rather than simplex copying.

6. The document handling method of claim 5 wherein, in response to both said selecting of said special copy sheet supply rather than said main copy sheet supply and said selecting of duplex copying rather than simplex copying, the copying of said document sheets on said special copy sheets is controlled by copying an odd number of document sheets differently from an even number on the first copying circulation to maintain proper orientation of said special copy sheets, but in response to selecting said main copy sheet supply no difference is made between an odd or even number of document sheets in copying document sheets on the first copying circulation, and copying is initiated on the first circulation of the document sheets and before they are all counted.

7. The document handling method of claim 6 wherein said feeding from said main copy sheet supply is automatically selected after each completion of copying of a document set onto copy sheets from said special copy sheet supply unless the selection of said special copy sheet supply is remade.

8. The document handling method of claim 5 wherein said feeding from said main copy sheet supply is automatically selected after each completion of copying of a document set unless the selection of said special copy sheet supply is made.

* * * * *